United States Patent

[11] 3,621,358

[72] Inventors Kurt Hinrichs;
 Gerd Wilken, both of Coburg, Germany
[21] Appl. No. 11,804
[22] Filed Feb. 16, 1970
[45] Patented Nov. 16, 1971
[73] Assignee ERC Electronic Research Corporation
 Basel, Switzerland
[32] Priorities Feb. 15, 1969
[33] Germany
[31] P 19 07 762.4;
 Nov. 19, 1969, Germany, No. P 19 58 032.6

[54] STEPPING MOTOR HAVING POSITIVE, NEGATIVE OR ZERO POTENTIAL APPLIED TO POINTS OF DELTA CONNECTED STATOR WINDING
8 Claims, 8 Drawing Figs.

[52] U.S. Cl. .......................................... 318/696
[51] Int. Cl. .......................................... H02k 37/00
[50] Field of Search .......................................... 318/138, 254, 696, 685; 310/49

[56] References Cited
UNITED STATES PATENTS

| | | | |
|---|---|---|---|
| 3,229,179 | 1/1966 | Hetzel .......................... | 318/138 |
| 3,297,927 | 1/1967 | Blakeslee et al. .............. | 310/49 |
| 3,312,885 | 4/1967 | Falk et al. ...................... | 318/138 X |
| 3,354,367 | 11/1967 | Stockebrand ................ | 318/138 |
| 3,412,303 | 11/1968 | Rakes............................. | 318/138 |
| 3,443,181 | 5/1969 | Kozol et al. .................... | 318/138 |
| 3,467,902 | 9/1969 | Shimizu et al. ................ | 318/138 |
| 3,508,130 | 4/1970 | Buskirk ......................... | 318/138 |

*Primary Examiner*—G. R. Simmons
*Attorney*—Spencer & Kaye

ABSTRACT: An electrical stepping motor having a two-pole permanent magnet rotor and a stator winding connected in a delta. The rotary field for the stator is produced by an electronic circuit which simultaneously applies either a positive, a negative or a zero potential signal to the three corners or inputs of the delta winding in a predetermined sequence whereby 12 steps per revolution are achieved.

3,621,358

STEPPING MOTOR HAVING POSITIVE, NEGATIVE OR ZERO POTENTIAL APPLIED TO POINTS OF DELTA CONNECTED STATOR WINDING

BACKGROUND OF THE INVENTION

The present invention relates to an electrical stepping motor having a permanent magnet rotor and a three-phase winding in which a rotating field is produced by means of an electronic circuit arrangement, i.e. an electronic rotating field generator.

It is quite generally known to produce a rotating field in two-phase motors by two field 1,488,100which are disposed at right angles to one another. With a rotor magnet having one pair of poles this results in four steps per revolution. In order to provide for an electronically controlled current direction reversal, both field windings in such motors are normally designed as double windings. Motors constructed in this manner, however, have the drawback of poor power utilization of the motor, since only a quarter of the possible winding area of the stator is used to produce the motor torque.

An improved stepping motor is also shown in the German laid-open Pat. application (Offenlegungsschrift) No. 1,428,100. In the motor illustrated in this patent, each one of the three stator windings is individually fed with current by a rotary field generator. The rotary field generator is an electronic circuit arrangement in which there are also provided electric switches which effect a blocking of those windings which are not to carry current at the moment. In this motor 12 steps per revolution are produced when a rotor is used which has four pairs of poles. This motor also suffers from the drawback that the power output is low when compared with the size of the motor. This relative low output results from the fact that only one of the three windings carries current at any one time so that only one-third of the stator winding area is utilized to produce a rotating field. This low power output also results in a low torque and thus a low stepping speed.

SUMMARY OF THE INVENTION

It is accordingly the object of the present invention, to avoid the drawbacks of the above-mentioned motors, and yet to provide a stepping motor which has approximately the same outer dimensions as the above-mentioned second motor but puts out a substantially greater amount of power and a substantially higher stepping speed.

This is accomplished according to the present invention in that the stator windings are connected in a triangle or delta in a known manner and that the rotary field generator applies voltage potentials simultaneously to all input points of the delta connected windings, which potentials change in a timed sequence and occur at the input points as positive, negative or zero potentials in a combination which is predetermined by the rotary field generator.

According to the present invention voltages are thus produced simultaneously across all of the windings in the form of digital pulses. The rotary field generator varies these voltages—for whose effectiveness it is only of importance that the pulses have either a positive, negative or zero potential—at the three individual delta input points in a predetermined manner. It is a significant feature of the invention that the zero potential is additionally produced since it, together with the positive and the negative potentials, provides a series of additional combination possibilities for the potential formation at the input points of the delta connected stator windings. This makes it possible to arrive at a greater number of steps per revolution without an increase in the number of pole pairs and the resulting decrease of the torque. With a two-pole rotor this type of control results in a division of one rotor revolution into 12 steps. Since current flows simultaneously in all windings it is possible, when compared with the stepping motors operated in the conventional manner, to realize an approximately fourfold increase in the stepping speed.

An advantageous further development of the present invention provides that the rotary field generator is a shift register with three storage positions which are connected so as to act as a ring counter, and that each storage position is connected to one of the input points of the delta connected stator windings via a logic circuit arrangement. With such a shift register it is very easy to produce a variation of the pulse voltages for the generation of the rotating field. Moreover it is possible to reverse the sense of rotation of the motor by changing the shifting direction of the shift register—by exchanging the terminals between the storage positions—without any special bother or trouble.

The shift register, according to a further feature of the present invention, is provided with three storage positions each having two outputs, whereby a clock pulse generator switches or transfers the stored information after each clock period.

According to a further advantageous feature of the present invention, the signals from all of the six outputs of the shift register are linked in a logic circuit arrangement and in an amplifier arrangement connected to the logic circuit arrangement in such a manner that positive potential pulses and negative potential pulses are produced at each input point of the delta connected windings in an alternating sequence for each of five half clock periods—these pulses being in phase-shifted relation with respect to one another at the above-mentioned three points—and that further scanning pulses with zero potential are produced in the logic circuit arrangement by the clock signal together with the output signals from the shift register for the duration of half a clock period. These scanning pulses fall in time between the transition from the positive to the negative potential of the above-mentioned pulses in such a manner that a total of 12 different potential combinations are produced at the input points of the delta connected windings corresponding to 12 steps of the motor for one revolution thereof. The generation of the zero potential for half a clock period shortens the positive or negative potential produced by the shift register, which potential would otherwise have a duration of six half clock periods, by half a clock period. The six combination possibilities for the output signals which can be produced by a three-position shift register are doubled by the additional scanning pulse, i.e., the pulse with zero potential, so that it is possible to electronically double the number of steps for the motor.

The present invention is further developed in a manner so that the L-output of one storage position of the shift register and the 0-output of the following storage position are combined in an evaluation channel, each consisting of a part of the logic circuit arrangement and an amplifier, and the 0-output of the first mentioned storage position and the L-output of the following storage position are combined in a further evaluation channel. The combination in the evaluation channels is such that a pulse train having positive and zero potentials is generated in one evaluation channel and a pulse train having negative and zero potential is generated in the other evaluation channel, with the positive or negative potential, respectively, being present for five half clock periods and the zero potential for seven half clock periods. The pulses of each two corresponding evaluation channels are combined or superposed on one another and applied to one of the input points of the delta connected winding.

In the above manner the L and 0signals of each two adjacent storage positions are combined to generate the pulses for one input point of the delta connected stator windings, an exception existing in the evaluation channels for the last storage position and the first storage position of the shift register in that the L and the 0 outputs are interchanged, i.e. the L signals are combined in one evaluation channel and the 0 signals in another. The corresponding L and 0 signals are always so disposed in time that the signal of the chronologically first one of the two storage positions of the shift register switches to its other switching state one clock period before the signal of the following storage position. Thus the two L and 0 signals which are combined are simultaneously either 0 or L for one clock period. The clock pulse appearing during this full clock period generates the scanning pulses during the remaining one-half of the clock period, i.e., the interval between clock pulses. These scanning pulses cause the positive or negative potential, respectively, at each input point of the delta connected windings to be applied only for five and not for six half clock periods and a zero potential to be produced at the winding inputs between the transition from the positive to the negative potential.

DESCRIPTION OF THE PREFERRED EMBODIMENTS

Figure 1:
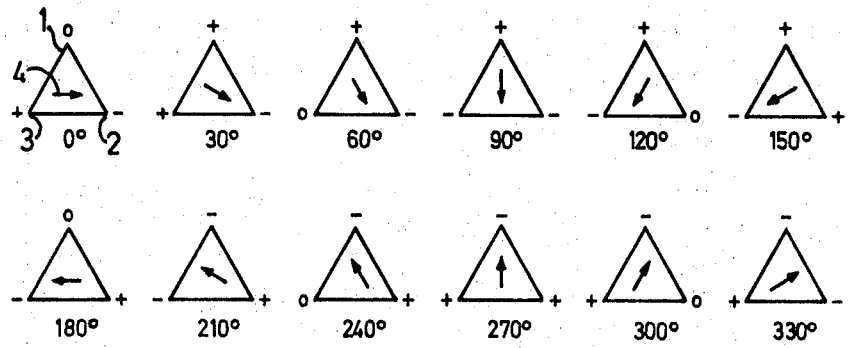
FIG. 1 illustrates diagrammatically the 12 different positions of the permanent magnet rotor and the corresponding pulse voltages at the inputs or corners of the delta connected stator winding.

FIG. 1 is a schematic representation of the three windings of the stepping motor which are connected in a triangle or delta. According to the control proposed by the present invention 12 different states result with respect to the voltage potentials applied to the three windings. The input points of the delta connected windings are marked 1, 2 and 3. The rotor of the motor is designed to be bipolar and its electromagnetically effective position is schematically shown by an arrow. A rotary field generator which will be discussed in detail below applies digital pulse voltages having positive (+), negative (−) or zero (0) potential to the input points 1 to 3.

In order to generate a torque in the rotor, it is principally necessary that the voltages at the input points of the stator windings have different polarities with respect to one another. By appropriate variation of the polarity of the voltages at the individual input points the rotor is driven by an electrical field which rotates in a predetermined direction. By applying the voltage pulses to input points 1–3 in the sequences illustrated in FIG. 1, the rotor will rotate in twelve separate steps in the manner shown.

Figure 2:
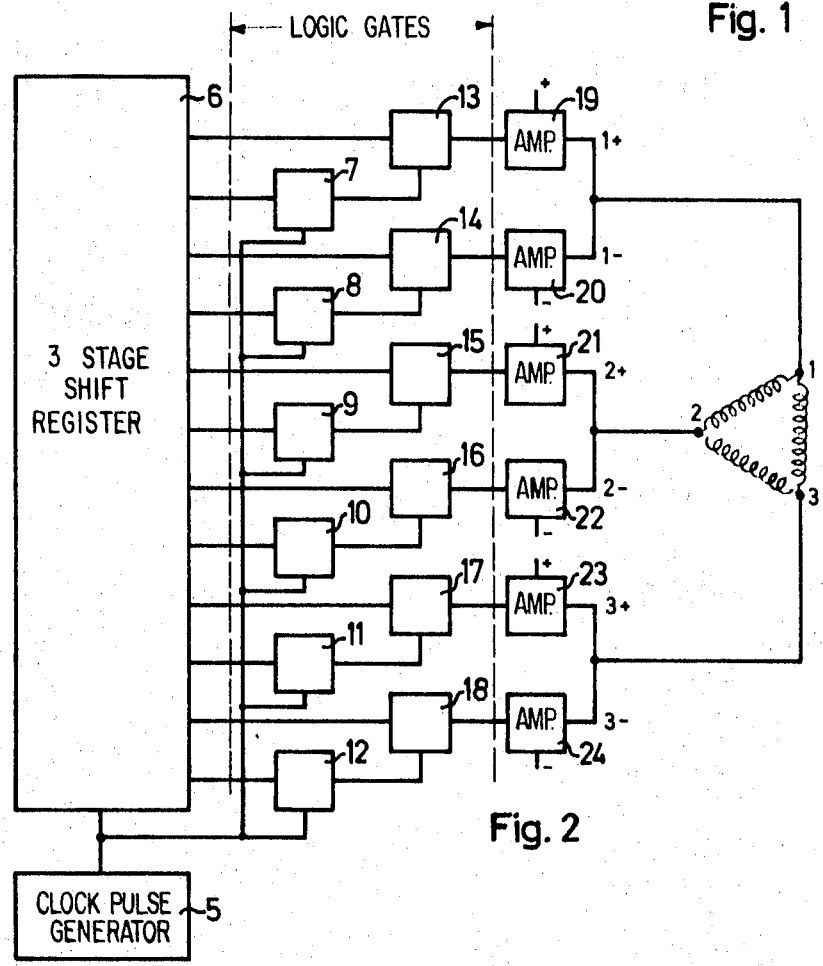
FIG. 2 is a block circuit diagram of a rotary field generator according to the present invention.

FIG. 2 shows, in a heavily schematic manner, a rotary field generator according to the invention. A clock pulse generator 5 produces a pulse sequence in which the ratio of pulse duration to pulse interval is equal to 1, i.e., each pulse has a duration equal to one half of a total clock period. A three-stage shift register 6 is connected to the output of the clock pulse generator 5, with the shift register 6 being connected in the form of a ring counter. That means that the negated output of the last storage position or stage is connected with the setting input of the first storage position. The output signals from the three storage positions — i.e. the L and the 0 output signals — are fed either to a first group of logic gates 7–12, or to a second group of logic gates 13–18, respectively. The gates according to the invention may be AND-NOT gates or OR-NOT gates. The two embodiments of gates are different only in that the signals employed have their polarities reversed. Each gate 13 to 18 is connected to one power stage 19–24 respectively, with the outputs of two adjacent power stages, e.g. 19 and 20, being combined and applied to one of the three input points 1–3 of the delta connected stator windings of the stepping motor. One power stage of each pair of power stages connected to one of the stator winding input points generates a positive pulse when switched on while the other power stage of each pair generates a negative pulse. According to the present invention, only one of the power stages is switched on for five half clock periods, whereas both power stages are switched off for a further half clock period.

Gates 7–12 have their second inputs connected directly to the output of the pulse generator 5, while their outputs form the second input for gates 13 to 18. As will be explained in detail below, the signals directly applied to gates 13 to 18 produce the rising edge from zero potential to positive potential or from zero potential to negative potential, respectively, for each pulse applied to an input point 1–3, while the output signals of gates 7–12 generate the descending edge of these pulses. During each half clock period in which the signals coming from the shift register 6 and the clock pulse generator 5 have the same switching state L or 0, respectively, a scanning pulse is generated during whose duration both power stages of one group, e.g., stages 21 and 22, are blocked, and consequently the potential applied to input point, e.g., 2 is zero.

The potential combinations generated at the three input points for the stator windings of the motor by the above described rotary field generator exhibit the time sequence shown in FIG. 1.

Figure 3:
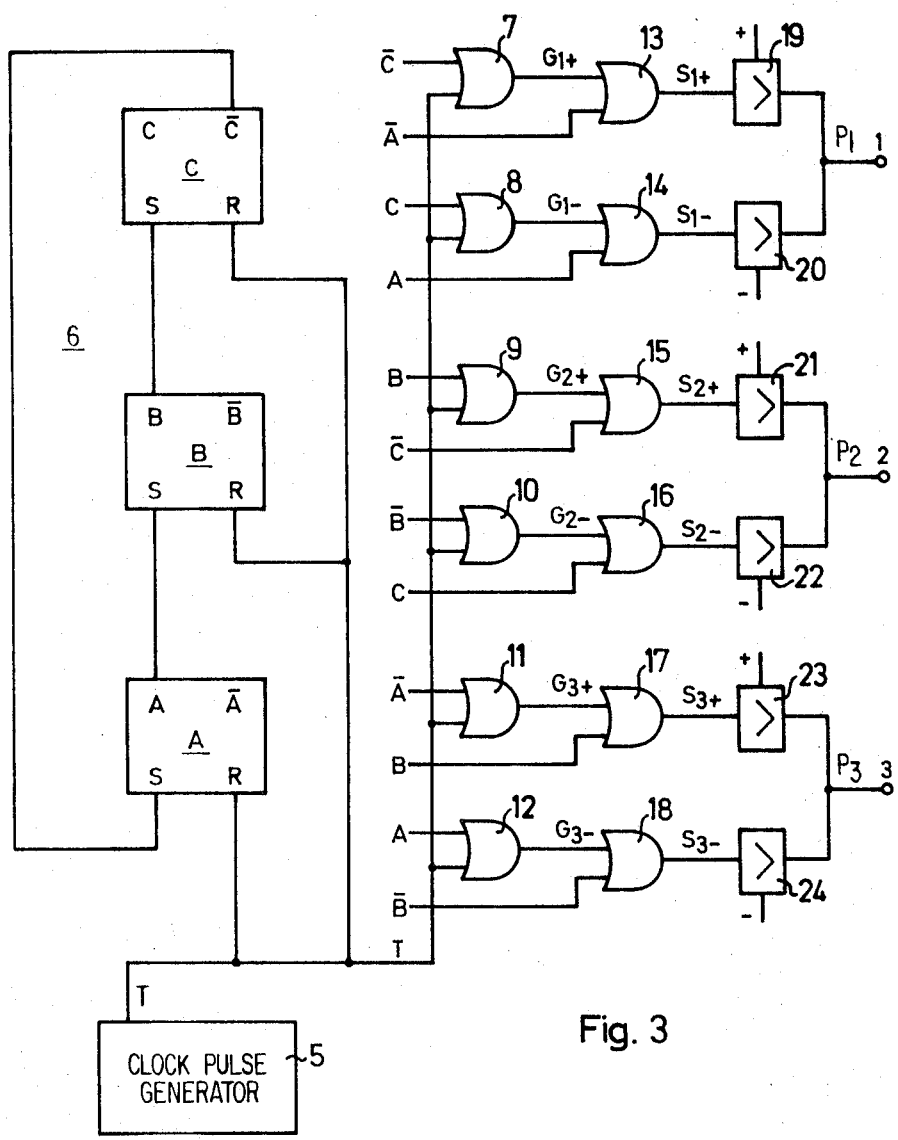
FIG. 3 is a circuit arrangement for a rotary field generator according to FIG. 2.

FIG. 3 is a detailed view of the above-described rotary field generator. Three storage positions in the form of flip-flops are marked A, B and C. The L outputs bear the designations A, B, C, and the negated outputs the designations $\bar{A}$, $\bar{B}$, $\bar{C}$. The outputs A, B of flip-flops A and B are connected with the control input S of the following flip-flop, B and C, respectively, while the output $\bar{C}$ of the last flip-flop is connected with the control input S of the first flip-flop A. The clock pulse generator 5 has its output connected in parallel to the clock pulse inputs R of all three flip-flops. The logic circuit arrangement consists entirely of OR-NOT gates (NOR gates). The pair of logic gates 7 and 13 and the corresponding power or amplifier stage 19 are referred to as an evaluation channel. The same applies for gates 8, 14 and the amplifier arrangement 20; gates 9, 15 and the amplifier 21, etc. The output signals A, $\bar{B}$ are logically linked in a first evaluation channel, consisting of gates 12 and 18 and amplifier 24, while the output signals $\bar{A}$ and B are linked in a second evaluation channel consisting of gates 11 and 17 and amplifier 23. The outputs of both of these evaluation channels i.e., the outputs of amplifiers 23 ans 24, are combined and applied to stator winding input point 3. Similarly the outputs of flip-flops B and C, and flip-flops C and A are logically linked in pairs of evaluation channels whose outputs are combined and applied to the stator winding input points 2 and 1 respectively. The clock pulse signal, which is applied to the inputs of all six gates 7 to 12, causes the further switching of the input signals from all of the flip-flops. The output signals from NOR gates 7–12 are indicated by a G, the output signals from gates 13–18 are marked with an S; and the clock pulse signals are designated by a T; and the signals applied to the inputs of the stator windings are designated by a P. The individual evaluation channels differ from one another only with respect to the potential (positive or negative), they apply to the respective stator winding input points, and of course the sequence of the potentials as determined by the input signals from the stages of the shift register. Signals G and S are thus marked with indicia such as 1+or 2−, etc. in order to differentiate between the signals from the various evaluation channels.

The various pulse trains appearing in the evaluation channels are shown in FIGS. 4 to 8 which will now be utilized to explain in detail the operation of the arrangement according to the invention.

Figure 4:
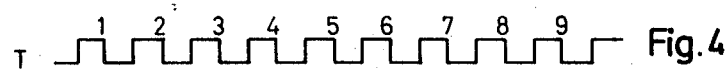
FIG. 4 shows the pulse diagram for the pulses at the output of the clock pulse generator.
Figure 5:
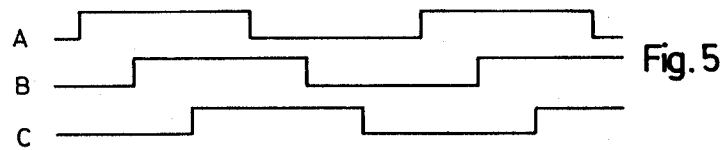
FIG. 5 shows the L output signals generated in the three storage positions of the shift register.

If a clock pulse sequence as shown in FIG. 4 is applied to the input of a shift register which is constructed in the above-described manner and whose switching state in all three storage positions A, B and C is (000) at the outset, a signal sequence as shown in FIG. 5 will appear at the outputs A, B and C of these flip-flops. Principally each storage position carries an L signal at its output during as many clock periods as the shift register has storage positions. In the following case in which three storage positions are provided in view of three motor windings, each storage position produces an L signal during three full clock periods —corresponding to six half clock periods-and produces an 0 signal during three full clock periods. Since after each clock pulse, a signal is shifted from one flip-flop to the next, the output signals of the three flip-flops are shifted in phase by one clock period with respect to one another. Due to the mutual shifting of signals A, B and C with respect to one another by one clock period, and due to the above-described combination of certain output signals from two consecutive flip-flops, there results the situation that the signal directly applied to one of gates 13 to 18 shifts its state one full clock period later than the signal applied to the corresponding one of the inputs of gates 7–12. As already mentioned, this spacing of one clock period is significant for the generation of the scanning pulse and the coinciding generation of a zero potential for the input points of the delta connected stator windings of the stepping motor. During the second half of the clock period (pulse interval) the first G pulse is generated which effects switching of a signal $S_{1+}$ or $S_{1'7E'}$ respectively, from L to 0. At this moment each one of these signals which are determinative for the duration of the motor control has lasted for five half clock periods so that by means of this G pulse a shortening of the signals A, B and C lasting six half clock periods to five half clock intervals is effected. From the combination of the signals $S_{1+\ 0}$ and $S_{1'7E'}$ into the pulse train signal 1, it can be seen that during the duration of each first G pulse the zero potential for the pulse train signal $P_1$, which is applied to input point 1, is generated.

Figure 6:
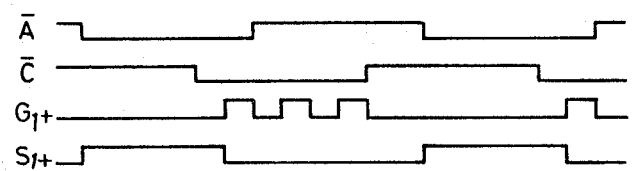
FIGS. 6 to 8 show the potentials appearing at various points in each of the evaluation channels and the resulting potential at the individual input points 1, 2 and 3 of the delta connected stator windings.
Figure 6:
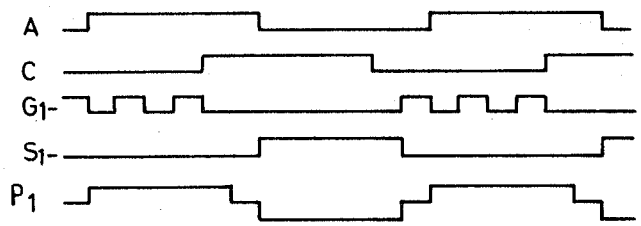
Figure 7:
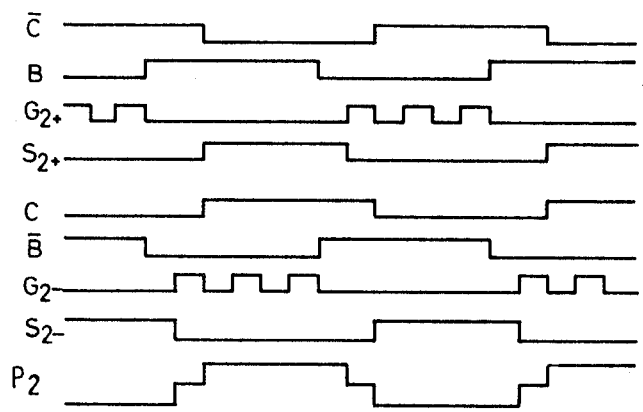
Figure 8:
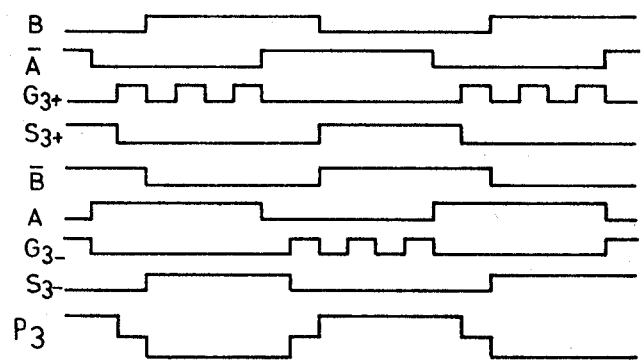

The operation of the arrangement will be explained in further detail for the two evaluation channels 1+ and 1– consisting of gates 7 and 13 or 8 and 14, respectively, and the associated power stages 19 and 20, whose signal trains are shown in FIG. 6 for the individual clock periods. For each of the NOR gates having two inputs, a signal L appears at its output only when the two input signals are 0. In all of the other three possible combinations of the input signals for the NOR gates there appears the output signal 0.

During the first clock period, the clock pulse and the signal $\overline{C}=L$, the output signal $G_{1+}$ and the signal $S_{1+}$ at the output of gate 13 is L since $\overline{A}$ is also 0. The same conditions are also present during clock period 2. At the beginning of clock period 3 the clock pulse T remains at L and consequently the signal $G_{1+}$ remains 0. Together with the signal $\overline{A}=0$, the signal $S_{1+}$ remains L. During the pulse interval of the third clock pulse period the signal $\overline{C}$ has become 0 and the clock pulse = 0. Consequently the output signal $G_{1+}$ of gate 7 becomes L and now this signal together with the signal $\overline{A}=0$ produces a signal $S_{1+} = 0$ at the output of gate 13. At the beginning of the fourth clock period the signal $\overline{A}$ becomes L and thus the output signal $S_{1+}$ at gate 13 remains 0. The further $G_{1+} = 0$. The above-described conditions continue during the entire clock period 5. At the beginning of the sixth clock period $\overline{C}$ becomes L, which together with T being L results in the signal $G_{1+}$ becoming 0. Since $\overline{A}$ remains L, signal $S_{1+}$ does not change. At the beginning of the seventh clock period both $\overline{C}$ and T are both L. Consequently G is 0 and produces, together with signal $\overline{A}$ which is simultaneously switched to 0, a signal $S_{1+}$ equal to L. This signal now remains in existence until the end of the first half of clock period 9. It thus results that signal $S_{1+}$ is L for five half clock periods and 0 for seven half clock periods.

Analogous to the above, signal $S_{1'7E'}$ is produced from signals A and C. At the output of amplifiers 19 and 20 pulse groups are produced based on the two signals $S_{1+}$ and $S_{1'7E'}$ which signals have positive and zero potential or negative and zero potential, respectively. These two pulse groups are superposed or combines at input point 21 and form pulse train $P_1$ (FIG. 1) which represents the potential distribution at this input point of the stator winding.

In an analogous manner pulse trains $P_2$ and $P_3$ are formed for input points 2 and 3. If the potentials of the three pulse trains $P_1$, $P_2$ and $P_3$ are compared for the different clock periods, the potential distribution shown in FIG. 1 results. It should here be noted that the 12 potential combinations, corresponding to the 12 steps of one revolution of the motor correspond to 12 half clock periods or six complete clock periods of FIGS. 4 through 8.

It will be understood that the above description of the present invention is susceptible to various modifications, changes and adaptations, and the same are intended to be comprehended within the meaning and range of equivalents of the appended claims.

We claim:

1. An electric stepping motor arrangement comprising:
   a motor having a stator with a three-phase delta-connected stator winding, and a permanent magnet rotor; and
   a rotary field generating means coupled to said stator or winding for simultaneously applying to each of the three input points of said stator winding a timed predetermined sequence or pulses having positive, negative and zero voltage potentials so that predetermined combinations of positive, negative and zero potentials are sequentially applied to the stator winding, whereby a stepped rotating field is produced, said rotary field generating means including; a shift register connected to function as a ring counter and having three storage positions each with two outputs, each storage position of said shift register being connected to one of the input points of said stator winding via a logic circuit arrangement; a clock pulse generator the output pulses of which are coupled to said shift register to cause the shifting of the stored information after each clock pulse period, each of the said output pulses from said clock pulse generator having a duration equal to one half of a clock period; and means, containing said logic circuit arrangement, responsive to the six output signals from said shift register and to said clock pulses for producing at each input point of said stator winding a train of pulses comprised of alternating positive and negative potential pulses each of which is five half clock periods in duration and each pair of which is separated by a zero potential pulse which is one half clock period in duration, said pulse trains being shifted in phase with respect to one another in such a manner that a total of twelve different potential combinations are produced at the three input points of the stator winding, resulting in twelve steps for the motor for each revolution of the rotor 2. An electric stepping motor arrangement as defined in claim 1 wherein said means responsive to the six output signals from said shift register comprises three pairs of evaluation channels with each evaluation channel including a portion of said logic circuit arrangement and a power amplifier; one evaluation channel of each pair of channels being connected to an output of one storage position of said shift register and to an output of the following storage position, and the other evaluation channel of each pair being connected to the other outputs of said one and said following storage positions; one evaluation channel of each pair being responsive to the signals from the respectively connected outputs of said storage position to produce an output pulse train having a positive potential for five half clock periods followed by a zero potential for seven half clock periods, and the other evaluation channel of each pair being responsive to the signals from the respectively connected outputs to produce an output pulse train having a negative potential for five half clock periods followed by a zero potential for seven half clock periods; and means connecting the outputs of the evaluation channels of a pair of channels together and to one of the said inputs of said stator winding.

3. An electric stepping motor arrangement as defined in claim 2 wherein a first of said pairs of evaluation channels is connected to the outputs of the first and second of said three storage positions, a second of said pairs of evaluation channels is connected to the outputs of said second and third of said three storage positions and the third of said pairs of evaluation channels is connected to the outputs of said third and first of said three storage positions; one evaluation channel of each of said first and second pairs of channels being connected to the L output of one storage position of said shift register and to the 0 output of the following storage position, and the other evaluation channel of each of said first and second pairs being connected to the 0 output of said one storage position and the L output of said following storage position; and, one evaluation channel of said third pair of evaluation channels being connected to the L outputs and the other evaluation channel of said third pair being connected to the 0 outputs of both said third and first storage positions.

4. An electric stepping motor arrangement as defined in claim 2 wherein each evaluation channel includes a pair of logic gates, the output signal of said one storage position and said clock pulse signal being applied as the input signals to a first of said gates, and the output signal of said first gate and the output signal from the said following storage position being applied as the input signals to the second of said gates.

5. An electric stepping motor arrangement as defined in claim 4 wherein said logic gates are NOR gates.

6. An electric stepping motor arrangement as defined in claim 4 wherein each of said second gates has its output connected to the power amplifier of the corresponding evaluation channel, the power amplifier of one evaluation channel of each pair being responsive to the output signal from the corresponding one of said second gates to apply a positive or a zero potential to the input point of said stator winding connected thereto, and the power amplifier of the other evaluation channel of each pair being responsive to the output signal from the corresponding one of said second gates to apply a negative or a zero potential to the input point of the stator winding connected thereto.

7. An electric stepping motor arrangement as defined in claim 2 wherein each of said evaluation channels includes a pair of NOR logic gates, the output signal of said one storage position and said clock pulse signal being applied as the input signals to a first of said gates and the output signal of said first gate and the output signal of said following storage position being applied as the input signals to the second of said gates, the outputs of said second gates being connected to the corresponding power amplifier in said evaluation channels; one power amplifier of each pair of evaluation channels emitting a positive potential pulse of five half pulse duration when actuated by the output signal from the corresponding second gate, and the other power amplifier of each pair of evaluation channels emitting a negative potential pulse of five half clock period duration when actuated by the output signal from the corresponding second gate.

8. An electric stepping motor arrangement as defined in claim 7 wherein said shift register is comprised of three clock pulse controlled flip-flops, the L output of the first and second flip-flops being connected to the control input of the subsequent flip-flop, and the 0 output of the third flip-flop being connected to the control input of the first flip-flop.